(12) United States Patent
Ofek et al.

(10) Patent No.: US 7,831,089 B2
(45) Date of Patent: Nov. 9, 2010

(54) MODELING AND TEXTURING DIGITAL SURFACE MODELS IN A MAPPING APPLICATION

(75) Inventors: Eyal Ofek, Redmond, WA (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/466,952

(22) Filed: Aug. 24, 2006

(65) Prior Publication Data

US 2008/0050011 A1  Feb. 28, 2008

(51) Int. Cl.
*G06K 9/00* (2006.01)
(52) U.S. Cl. .................................. 382/154; 396/324
(58) Field of Classification Search ................. 382/154; 396/324, 325, FOR. 914
See application file for complete search history.

(56) References Cited

U.S. PATENT DOCUMENTS

| | | | |
|---|---|---|---|
| 4,157,218 A | 6/1979 | Gordon et al. | |
| 4,489,322 A | 12/1984 | Zulch et al. | |
| 4,890,314 A * | 12/1989 | Judd et al. | 348/14.01 |
| 5,056,901 A | 10/1991 | Rieche et al. | |
| 5,974,165 A | 10/1999 | Giger et al. | |
| 6,094,501 A | 7/2000 | Beatty | |
| 6,473,119 B1 | 10/2002 | Teuchert | |
| 6,661,913 B1 | 12/2003 | Zhang et al. | |
| 6,672,535 B2 | 1/2004 | Brunner et al. | |
| 6,864,889 B2 | 3/2005 | Blaho | |
| 6,999,073 B1 | 2/2006 | Zwern et al. | |
| 7,057,663 B1 * | 6/2006 | Lee | 348/423.1 |
| 7,268,803 B1 * | 9/2007 | Murata et al. | 348/218.1 |
| 7,526,718 B2 * | 4/2009 | Samadani et al. | 715/201 |
| 7,630,724 B2 * | 12/2009 | Beyer et al. | 455/457 |
| 2002/0126890 A1 * | 9/2002 | Katayama et al. | 382/154 |
| 2002/0180759 A1 | 12/2002 | Park et al. | |
| 2003/0185549 A1 | 10/2003 | Partynski et al. | |
| 2004/0167709 A1 * | 8/2004 | Smitherman et al. | 701/208 |
| 2005/0128212 A1 * | 6/2005 | Edecker et al. | 345/582 |
| 2006/0083501 A1 | 4/2006 | Sega et al. | |
| 2006/0178830 A1 * | 8/2006 | Sherony | 701/301 |
| 2009/0122295 A1 * | 5/2009 | Eaton | 356/5.01 |

OTHER PUBLICATIONS

International Search Report for International Patent Application No. PCT/US2007/017355 dated Dec. 18, 2007, 3 pages.
Baltsavias, E., et al.; Resolution convergence a comparison of aerial photos, LIDAR and IKONOS for monitoring cities; 38 pages.
Leberl, F., et al. Mobile mapping and computer vision for generation of 3D site models; 10 pages.
Destruel, C., et al. Automatic 3d Rendering of High Resolution Space Images; 6 pages.

* cited by examiner

*Primary Examiner*—Matthew C Bella
*Assistant Examiner*—Gregory F Cunningham
(74) *Attorney, Agent, or Firm*—Shook, Hardy & Bacon LLP (57) ABSTRACT

Digital Surface Model (DSM) texturing and modeling of various objects on the earth's surface are provided for implementation in a mapping application. One or more image capture devices having wide-angle lenses can be placed in various configurations to obtain nadir and oblique photography. Such configurations include a single lens, single sensor; single lens, multiple sensor; multiple lens, multiple sensor; and multiple lens, multiple sensor and a reflective surface. Positions, distances and areas can be measured from the imagery. Also provided is a continuous morph between aerial panorama and ground images.

20 Claims, 8 Drawing Sheets

MODELING AND TEXTURING DIGITAL SURFACE MODELS IN A MAPPING APPLICATION

BACKGROUND

Large-scale mapping applications have increased the importance and volume of modeling of earth terrain as well as models of buildings and other objects that exist on the ground surface. The general name for these objects is Digital Surface Model (DSM). The name for the terrain only, without buildings and other structures is Digital Elevation Model (DEM). Buildings, structures, and various other objects (e.g., mountains, trees, and the like) can be viewed at a variety of navigation angles (e.g., oblique-view, bird's eye angle, perspective angle, top viewing angle, front viewing angle, downward trajectory, upward trajectory, and so on) in such mapping projects. While such navigation angles are available for some locations, the information is lacking for a multitude of other locations. Therefore, such mapping applications are lacking the detail and modeling aspects for a majority of locations.

To overcome the aforementioned as well as other deficiencies, provided are embodiments that provide a means for modeling and texturing DSM and applying such information in a mapping application.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with DSM texturing and modeling for mapping applications. According to some embodiments is a technique for capturing images that combines advantages of nadir and oblique photography for modeling and texturing. Position, distances and areas can be measured from the imagery. In accordance with some embodiments, there is a continuous morph between aerial panorama and ground imagery.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

Figure 1:
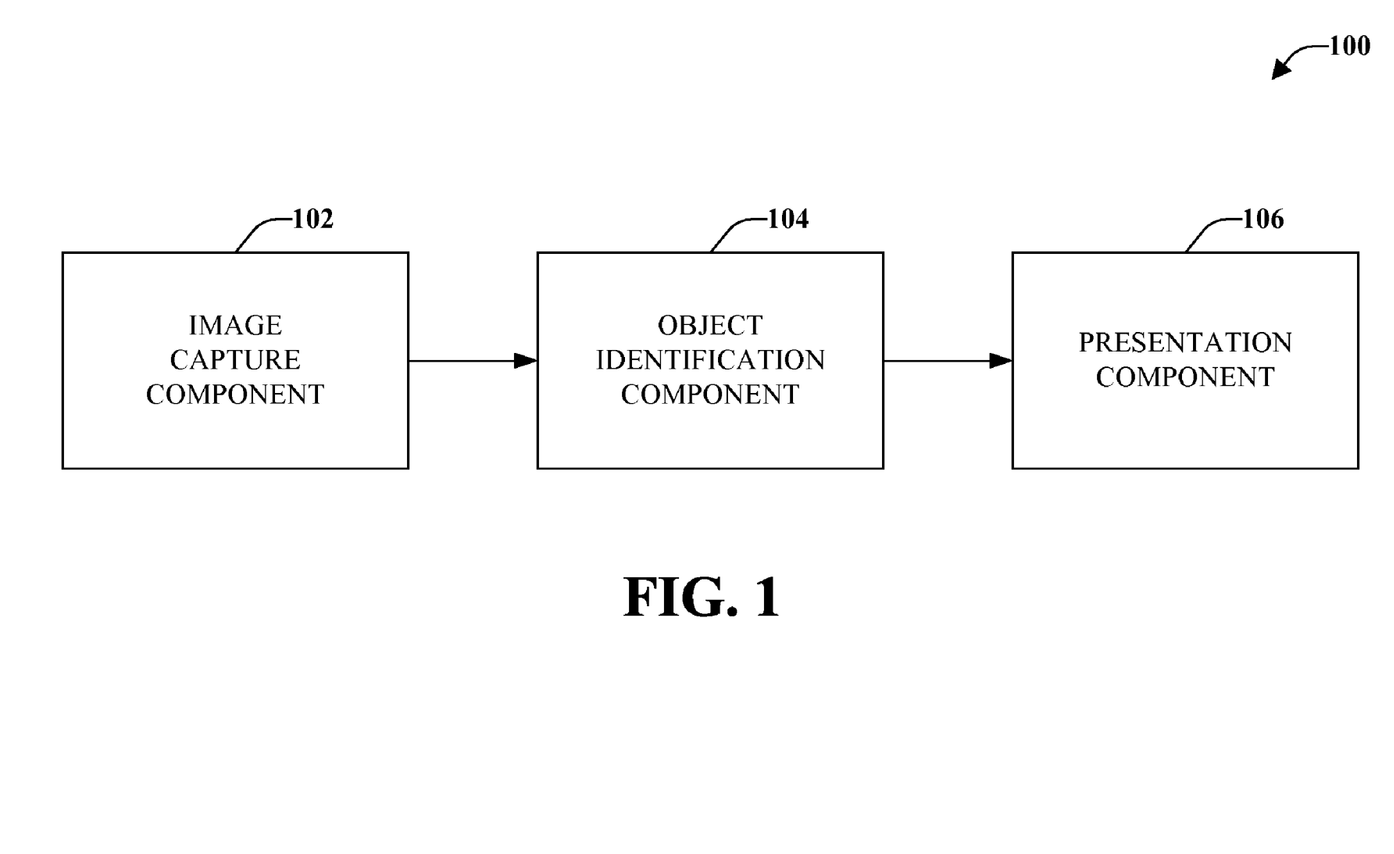
FIG. 1 illustrates an exemplary system for capturing aerial DSM images and applying such aerial imagery to a plurality of photogrammetric products.

FIG. 1 illustrates an exemplary system 100 for capturing DSM aerial images and applying such aerial imagery to a plurality of photogrammetric products. System 100 combines the advantages of nadir photography and oblique photography.

To fully appreciate the disclosed embodiments, the general process for generation of a Digital Surface Model (DSM) will be explained. DSM imagery involves capturing several nadir (e.g., the camera points down, directly at the ground) photographs of the ground and other structures. The position of the camera is calculated at substantially the same time as the image is captured or after the image is captured, such as in post processing. The position can be determined by identifying corresponding points between each image and known ground points, and between the images (known as bundle adjustment). Modeling of the ground, buildings, and other objects is performed by matching corresponding points on the object, as seen in more than one image. For example, a corner of a building is identified in at least two images. The modeling can be performed utilizing nadir imagery since images that are parallel to the ground show almost a constant scale. Modeling can also be performed on sensors, such as Oblique imagery or wide-angle sensors. For example, a building that appears at the edge of the frame is represented in a similar scale to another building at the center of the frame. Given the position of the camera when each image was taken as well as the camera internal parameters, each image point can be translated to a view ray in space. Intersecting those rays generates the position in space of the building corner. Identification of corresponding points and recovery of the three-dimensional points may be performed manually or automatically utilizing various techniques.

By utilizing the recovered three-dimensional points, a model of each building is constructed. The building models can be textured. Each model consists of planar facets or other surface primitives (e.g., Non-Uniform Rational B-Spline or NURBS, which is a mathematical definition for a surface element used in modeling). Each primitive is projected onto an image in which it is visible. The image data is used as the primitive texture.

Modeling and texturing utilizes a combination of nadir photography and oblique photography. There is an option to model buildings from oblique photography, however, there as several difficulties associated with this. First, the ground scale of an oblique image is changing along the frame. As a building is closer to the horizon, its reconstruction accuracy deteriorates at a rate of 1/z, where z is the distance from the camera to the ground point. Also, an oblique image captures the facets of objects that face that direction, for example, only northern facets of buildings. To obtain a complete model of the buildings (and texture coverage) several images are necessary, wherein each image is taken from a different direction. Visibility is more complex as the view angle approaches a horizontal direction since buildings may be occluded by an object (e.g., building, structure, tree, and so forth) that is between the building and the camera. Under complex visibility, an oblique image, facing north, for example, may not capture the full south facets of all buildings in the frame. Therefore, there is a need for more imagery.

Thus, system 100 can be configured to combine the advantages of nadir photography and oblique photography. System 100 includes an image capture component 102, an object identification component 104, and a presentation component 106. Although a number of image capture components(s) 102 and object identification component(s) 104 can be included in system 100, as will be appreciated, a single image capture components 102 that interfaces with a single identification component 104 is illustrated for purposes of simplicity.

The image capture component 102 includes a lens designed to capture light approaching the lens from a wide angle. The image capture component 102 can be configured to capture the image in at least one of a nadir position and an oblique position. Various aspects associated with an image capture component 102 may be described herein with reference to a camera. It should be appreciated that any technique for capturing or taking a photograph of the earth's surface and objects along the surface of the earth can be utilized with the one or more disclosed embodiments. Various configurations of the image capture component 102 will be provided below.

System 100 can utilize an extreme wide lens (above 120 degrees) associated with image capture component 102, that is directed straight down. The central part of the field of view can be equivalent to a nadir photograph while the rim of the image can be equivalent to oblique photography in a direction of 360 degrees (in the azimuth direction). As system 100 scans the ground, the high accuracy center image can be utilized as the basis for the modeling while the rim of the image generates dense coverage of the building sides from each direction.

The object identification component 104 can be configured to accept various images and identify a similar object or location in such image. Such identification of objects or locations can be a manual function, whereby object identification component 104 receives an input from a user and/or entity (e.g., the Internet, another system, a computer, . . . ) and associates a particular image or subset of an image with an object or location. In accordance with some embodiments, object identification component 104 autonomously identifies similar objects or locations among a multitude of images and automatically associates the image or a portion of the image with the object or location. The association of the object or location with the imagery can be applied to a mapping application that employs a large number of images to represent a model of the earth as well as various objects located on the earth's surface.

The presentation component 106 can be configured to present or display the resulting image in a display screen. Such presentation can be in a mapping application whereby a user requests a display of a particular location in a multitude of navigation angles. In such a manner, the user is presented with a rich display that provides modeling and texturing of real-world images.

Figure 2:
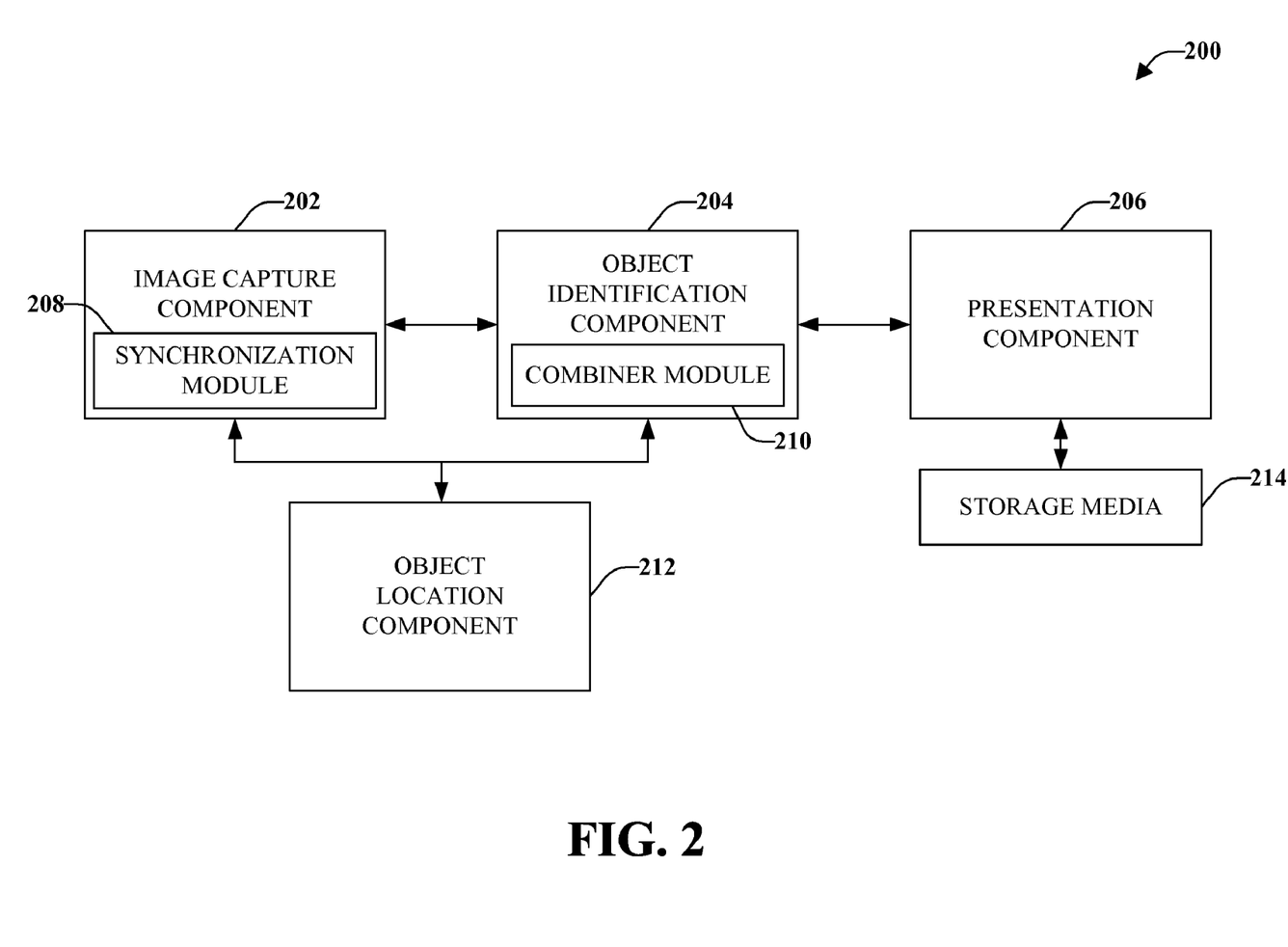
FIG. 2 illustrates another exemplary system for texturing and modeling images.

FIG. 2 illustrates another exemplary system 200 for texturing and modeling images. System 200 can utilize image processing procedures to produce a variety of products. For example, system 200 can be configured to obtain direct measurement of position, distances and areas from imagery data. System 200 can obtain orthophoto images of the ground surface and/or oblique views of the ground surface. Modeling of three-dimensional DSM can be provided by system 200 and/or texturing of the model. Alternatively or in addition, system 200 can provide a continuous morph or transformation between an aerial 360 degree-view to a ground 360-degree panorama view.

An aerial panorama is an image showing a full 360 view of the scene. Such a view can be either a cylindrical strip that is roughly parallel to the ground or a part of a hemisphere around the camera's view direction. A ground panorama is a strip showing the environment around the point of capture, or a hemisphere around the point of view.

Using a ground DEM and a recovered DSM, intermediate panoramas that span a trajectory between an aerial panorama and the ground based one can be generated. For example, the image can be generated by reprojection of the texture geometry, or by morphing the original images to the position of the projected geometry. This can provide a smooth transition between the aerial imagery to ground level imagery, between two aerial images, or between two ground images.

System 200 includes an image capture component 202 that can be configured to capture a multitude of images from various angles. Image capture component 202 can Also included in system 200 is an object identification component 204 that can be configured to identify an object in a viewing area and a presentation component 206 that can be configured to display the captured image to a user in a mapping application display screen, for example.

Image capture component 202 can comprise various configurations. For example, image capture component 202 can include a single lens and single sensor; a single lens and multiple sensors; multiple lenses and multiple sensors; multiple lenses, multiple sensors and a reflective surface, or other configurations. Image capture component 202 can be, for example, an aerial camera that includes a very wide angle (e.g., at least 120 degrees) and a high resolution sensor.

In accordance with some embodiments, a synchronization module 208 can be associated with image capture component 202. Synchronization module 208 can be configured to synchronize an image capture time or other parameters with at least one other image capture component to facilitate a common capture of a similar scene. It should be understood that while synchronization module 208 is illustrated as included in image capture component 202, in accordance with some embodiments, synchronization module 208 can be a separate component or associated with other system 200 components.

A combiner module 210 can be included in object identification component 204 or can be a separate module, in accordance with some embodiments. Combiner module 210 can be configured to obtain multiple images received from multiple image capture components and combine the images. Thus, combiner module 210 can present a larger image as well as a more detailed image from various navigation angles.

For example, a first image capture device can capture a first and second image and a second image capture device can capture a third and a fourth image. Synchronization module 208 can synchronize the capturing of the four (or more images) and combiner module can combine the images, based in part on at least one identified object located in the image.

System 200 can also include an object location component 208 that can interface with image capture component 202, object identification component 204, or both components 202, 204. Location component 212 can be configured to convert any location on an image plane of the image capture component 202 to a ray in space. Such configuration can take into consideration internal parameters of the image capture component 202. Given a position and orientation of the image capture component 202, location component 212 can be configured to intersect a ray with a ground model and determine a position in space that corresponds to the point in the image. The position and orientation can be determined by utilizing an Inertial Measurement Unit (IMU) or it can be recovered from the image by identifying ground control points.

In some embodiments, location component 212 can be configured to intersect two or more rays, each originating from a different position of the image capture device 202. Each ray can correspond to different images of a similar world point in each of image plane of the image capture device 202.

Location component 212 can further be configured to measure a distance that can be a linear distance between two points or a length along a polyline, which is a continuous line composed by one or more line segments that can be defined by a series of points. The image points can be mapped by location component 212 to the corresponding ground points for distance calculation. In a similar manner, location component 212 can measure areas on the ground or earth's surface by defining an area polygonal boundary in the image. Such an area can be determined using the ground position of the points corresponding to the polygon vertices in the image.

When a user desires to view a particular location or object in a mapping application, the user interfaces with presentation component 206, which can be associated with a computer or other computing device, whether stationary or mobile. Such interface can include the user entering an exact location (e.g., longitude, latitude) or by entering an address, city, state, or other identification means. Presentation component 206 can provide various types of user interfaces. For example, the presentation component 206 can provide a graphical user interface (GUI), a command line interface, a speech interface, Natural Language text interface, and the like. For example, a GUI can be rendered that provides a user with a region or means to load, import, select, read, etc. the desired location, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The images obtained can be maintained in a retrievable format in a storage media 214. The storage media 214 can be associated with presentation component 206 or another system 200 component. Storage media 214 can be memory and/or some other medium that can store information. By way of illustration, and not limitation, storage media 214 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 3:
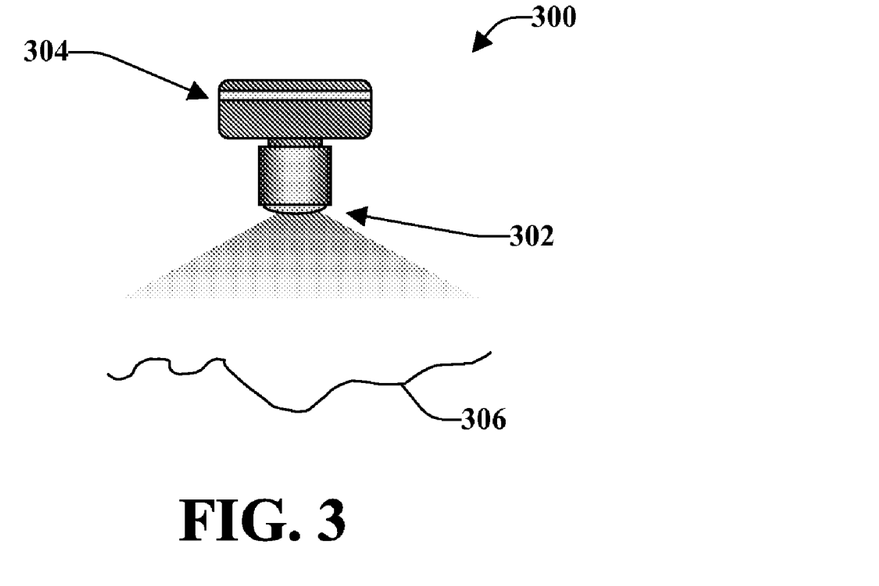
FIG. 3 illustrates an exemplary image capture device that can be utilized with the disclosed embodiments.

FIG. 3 illustrates an exemplary image capture device 300 that can be utilized with the disclosed embodiments. Image capture device 300 includes a single lens 302 and a single sensor 304. The image capture device 300 can be a high definition camera 304 that uses a super-wide lens 302. The camera 304 can be mounted on an aircraft pointing straight down at the earth 306 or other terrain. The resulting image has a varying ground scale that is higher near its center and reducing as the image reaches the horizon.

Figure 4:
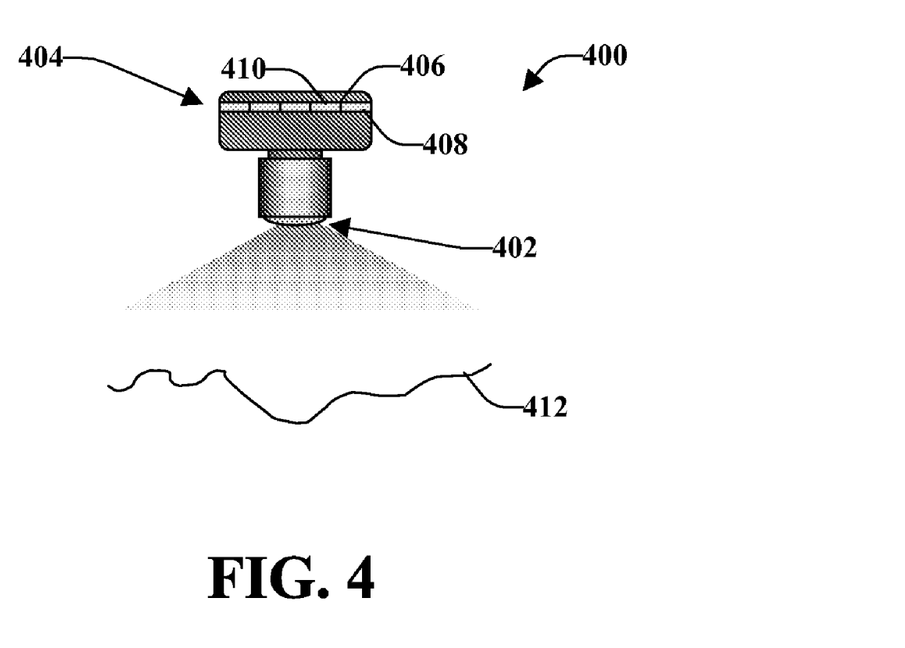
FIG. 4 illustrates another exemplary image capture device that can be utilized with the disclosed embodiments.

FIG. 4 illustrates another exemplary image capture device 400 that can be utilized with the disclosed embodiments. Image capture device includes a single lens 402 and multiple sensors 404. While four sensors 404 are shown, image capture device 400 can include any number of sensors. Utilizing multiple sensors 404 can reduce the expense associated with image capture device 300 illustrated in FIG. 3. There are seams 406 (of which only one is labeled) between neighboring sensors 408, 410, that are not covered by the array of sensors 404. The image capture device 400, which can be a wide-angle lens camera, is pointing straight down at the earth or other terrain 412. Images of various areas of the terrain 412 may not be captured or photographed due to the seams 406 between neighboring sensors 408, 410. These areas of the terrain 412 can be covered in a next exposure or by a second image capture device (not shown) capturing a similar area of the terrain 412 at substantially the same time as the first image capture device 400. In such a manner, the entire terrain can be captured through interaction of imagery of multiple image capture devices.

Figure 5:
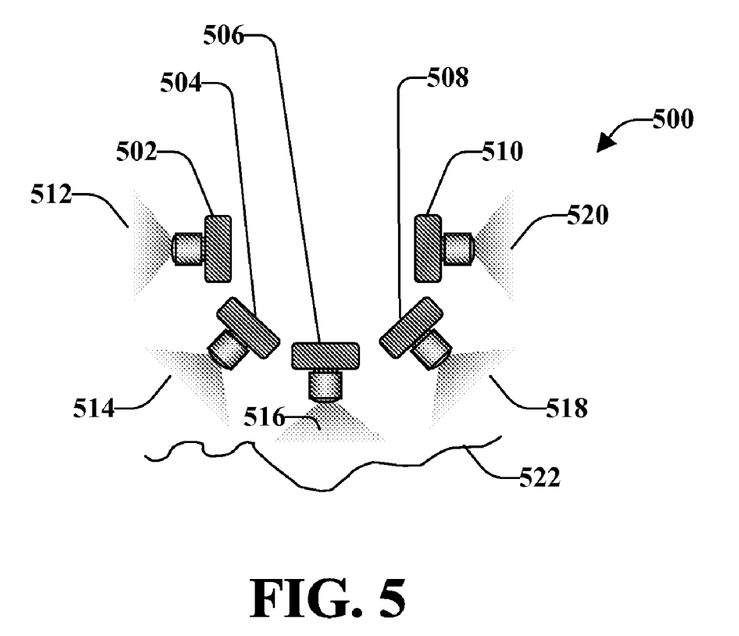
FIG. 5 illustrates an exemplary configuration of multiple image capture devices that can be utilized with the various embodiments disclosed herein.

FIG. 5 illustrates an exemplary configuration 500 of multiple image capture devices that can be utilized with the various embodiments disclosed herein. A multitude of image capture devices 502, 504, 506, 508, 510 can be mounted under an aircraft or other vehicle in an outward facing configuration such that the combined view angles 512, 514, 516, 518, 520 cover an entire hemisphere or about 120 degrees around the nadir direction for some minimal distance. The image capture devices 502, 504, 506, 508, 510 can be synchronized to facilitate a common capture of a similar scene or terrain 522. This configuration 500 provides multiple lenses and multiple sensors due to the multiple image capture devices 502, 504, 506, 508, 510. It should be noted that while five image capture devices are shown, there can be more or fewer capture devices in system 500.

Figure 6:
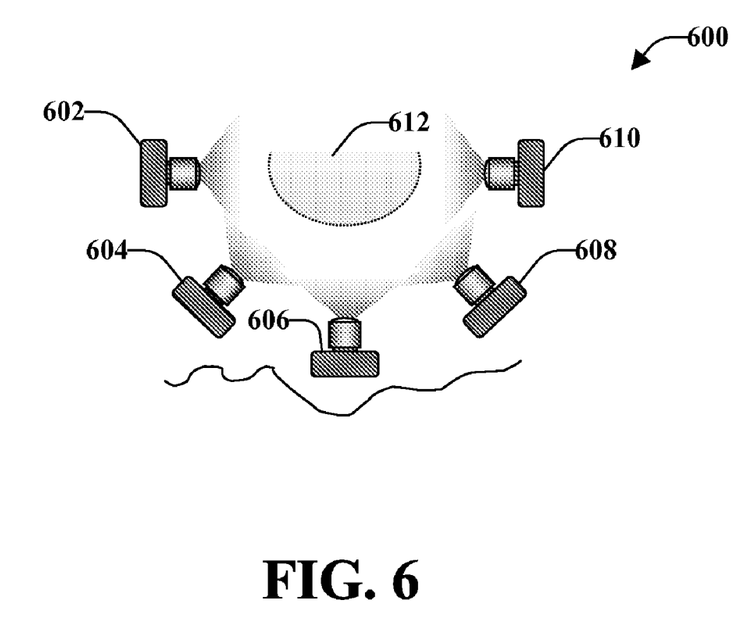
FIG. 6 illustrates another exemplary configuration of multiple image capture devices that can be utilized with the various embodiments disclosed herein.

FIG. 6 illustrates another exemplary configuration 600 of multiple image capture devices that can be utilized with the various embodiments disclosed herein. This configuration 600 of multiple image capture devices 602, 604, 606, 608, 610 provides multiple lens, multiple sensors, and a reflective surface 612. The reflective surface 612 can be a mirrored surface that reflects the rays from the hemisphere around an aircraft to image capture devices 602, 604, 606, 608, 610 that are placed in an inward facing configuration. It should be noted that more or fewer image capture devices can be included in system 600.

This configuration 600 has been known for omni-view cameras. However, using a single camera suffers from several limitations. First, the reflective surface or mirror 612 maps the rays of the hemisphere to a circular image on the camera's sensor. In many situations, the resolution of the angles that are far from the direction of the camera deteriorates or is at a low resolution. Next, the total resolution of the image is limited by the resolution of the sensors. Lastly, the center of the image illustrates the reflection of the camera itself in the reflective surface or mirror. Thus, the camera itself blocks the rays for a particular area from the scene or resulting image.

To mitigate the problems associated with a single image capture device, multiple image capture devices 602, 604, 606, 608, 610 are utilized to capture the image of the reflective surface or mirror 612 from several directions. The final generated image is a fusion of the images of each image capture device 602, 604, 606, 608, 610 and with removal of the images of the reflection of the devices 602, 604, 606, 608, 610.

An orthophoto is a photographic coverage of the earth, having constant ground scale and taken by orthographic projection from overhead. Generally an orthophoto is generated utilizing a nadir image (e.g., taken by a camera or device that is looking straight down), and a DSM. The DSM can be a 2.5-dimensional surface, measuring the height at each ground point (including buildings and other objects above the ground). The DSM can be captured by a range of sensors, such as a Light Detecting and Ranging (LIDAR) sensor, an InterFerometric Synthetic Aperture Radar (IFSAR), or other sensors. The DSM may be generated from pairs of larger groups of nadir images that cover the same ground area or regions, such as by a stereo process.

The orthophotos can be generated by defining an image with a defined ground resolution. Each pixel of that image can represent a ground point that is projected on the original image, taking into consideration the camera position orientation and internal parameters (e.g., focal length, . . . ). The ground point can be defined by a longitude-latitude (X-Y) location and its height obtained from the DSM. The color of the image, at the projection point, can be utilized to color the orthophoto image.

A nadir image that is used for generation of an orthophoto can have a view angle of about forty degrees or less. An aerial image capture component utilizing the disclosed embodiments can capture a bundle of view rays in the central part of its image similar to those captured by a nadir image. For example, the central forty degrees area of the image can be substantially the same as a view of a standard forty degree aerial camera.

Orthophotos can be generated by utilizing the embodiments shown and described herein. For example, in a configuration including one sensor and one lens, such as a wide-angle lens, the lens can behave as a pinhole camera. In such a manner, the area of the sensor that views the same foot print (assuming same flight height and a view angle of 120 degrees) is about sixteen percent of the sensor's area. To obtain a similar resolution orthophoto a sensor such as a 60 MPixel sensor can be utilized. In another embodiment, if a lens that maps equal angles to equal distance on the image plane is utilized, a sensor of about 90 MPixel can be utilized. However, other lens and sensors can be utilized with the one or more embodiments disclosed herein.

For a multiple sensor and one lens configuration, an array of sensors, such as a 3 by 3 array of sensors can be utilized to generate an image. Each sensor can be similar to the sensor utilized for orthophoto photography. The middle sensor in a 3 by 3 array can generate an image equivalent to a regular orthophoto.

For a multiple lens and multiple sensor configuration the camera, which is pointed in the nadir direction, can be utilized to generate a similar orthophoto image. For a configuration that includes multiple lenses, multiple sensors, and a reflective surface, the reflection of the image capture component should be removed from the image. The images obtained by the other image capture components can be utilized to reconstruct the image without the reflection, such as by a fusion technique.

Oblique views are images obtained by image capture components or cameras that are tilted relative to the nadir direction. Oblique views show details that are obscure from nadir images, such as details of a side of a building. The oblique images can be easier for a user to recognize, since it illustrates the scene objects from an angle closer to ground level, which can be more familiar to the user.

In contrast to nadir images, oblique images are directional. That is to say, an oblique image of a point from the south is different from an oblique image of the same point from the north. As a result, if all possible oblique images of a scene are to be shown in a mapping application, it is not sufficient to capture the view of the scene at each point, but the scene should be captured from all different directions at each point.

Figure 7:
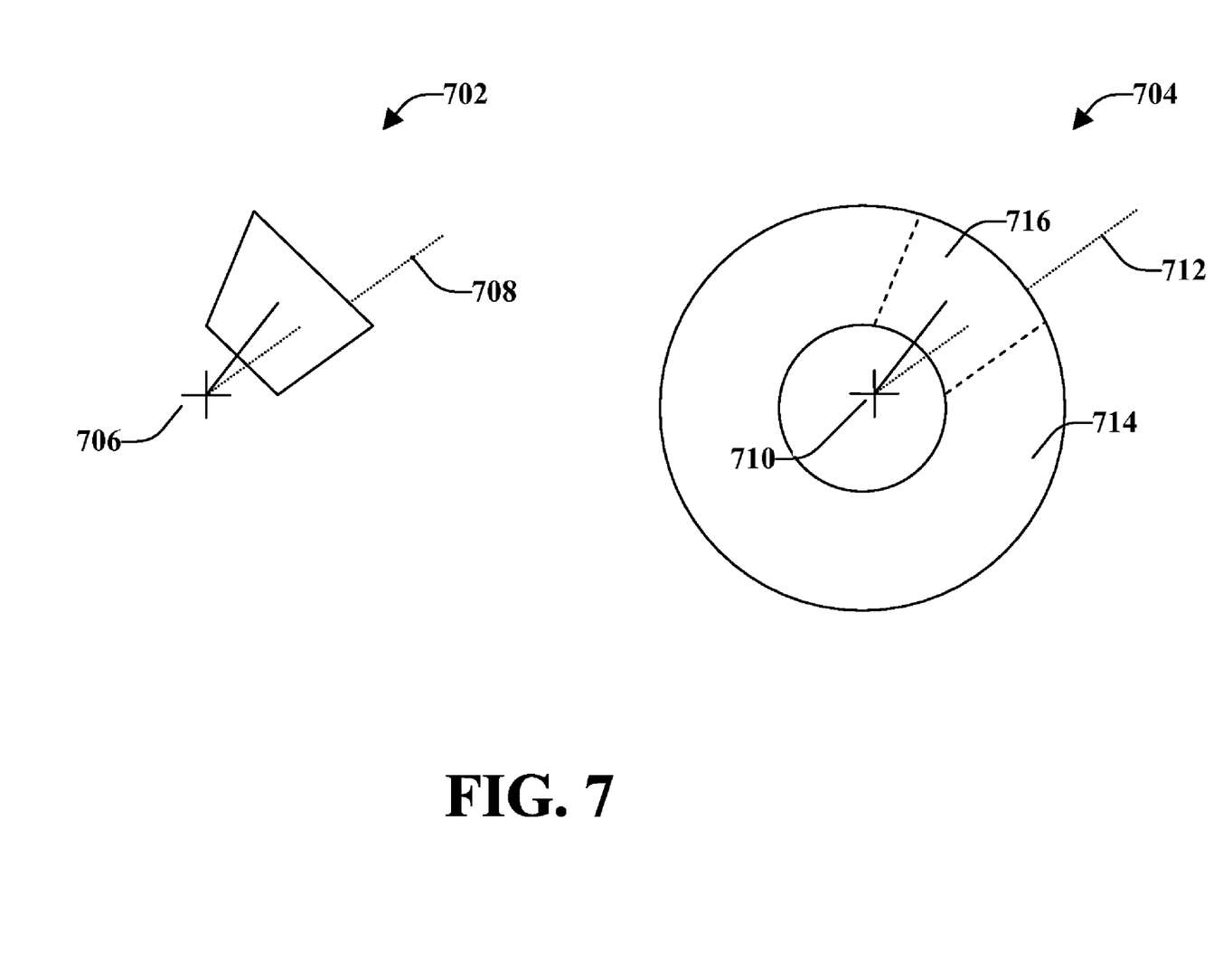
FIG. 7 illustrates an oblique imagery that can be utilized with the one or more embodiments.

Referring now to FIG. 7, illustrated is an exemplary view direction for an oblique imagery. An oblique imagery can have a view direction measured by an angle from the vertical, nadir direction. A typical value can be, for example, 40 degrees for the tilt angle and about 40 degrees for the view angle.

The illustration at 702 is an oblique imagery, as viewed from above and, at 704, illustrated is a super-wide imagery utilizing the disclosed embodiments. The first view, 702, shows the camera position 706 and one represented ray 708. The camera 706 can capture the color of all the view rays 708 in the frustum defined by the image plane. The super-wide imagery 704 has a camera position 710 and captures all the rays, of which one is illustrated at 712, that pass through a ring 714 around the view angle. The marked area of the ring 716 is the ray's equivalent to the oblique imagery of 702.

Figure 8:
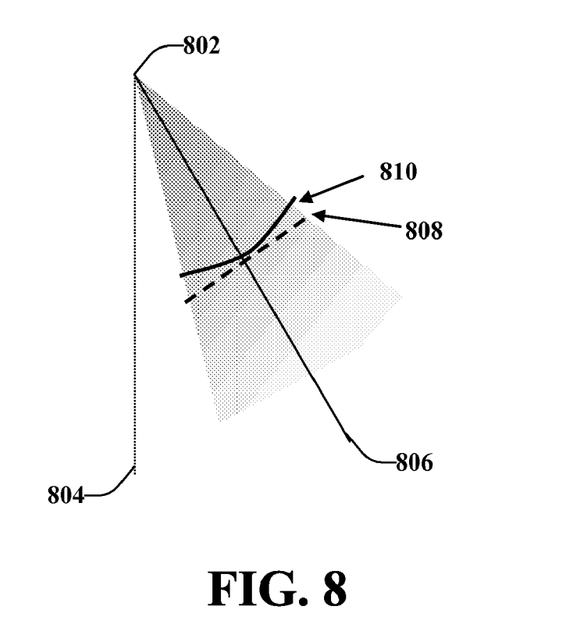
FIG. 8 illustrates a representative difference between an oblique imagery flat plane and a hemispherical image plane of an ultra wide image.

With reference to FIG. 8, illustrated is a representative difference between an oblique imagery flat plane and a hemispherical image plane of an ultra wide image. The generation of the oblique imagery is performed by defining an oblique image plane and connecting each pixel on the plane with the center of the image capture component. The intersection of the ray, connecting a pixel on the oblique image plane and the center, with the super-wide image plane, defined the color of the oblique pixel.

A camera focal point 802 points straight down to a nadir direction 804. While utilizing a super-wide lens to capture imagery, the ring of rays, from around 20 degrees from the nadir 804 to about 60 degrees from the nadir 804, which can be an oblique view direction 806 generates an oblique image plane 808. The corresponding ultra wide image plane that can be obtained utilizing the disclosed embodiments is illustrated at 810.

Figure 9:
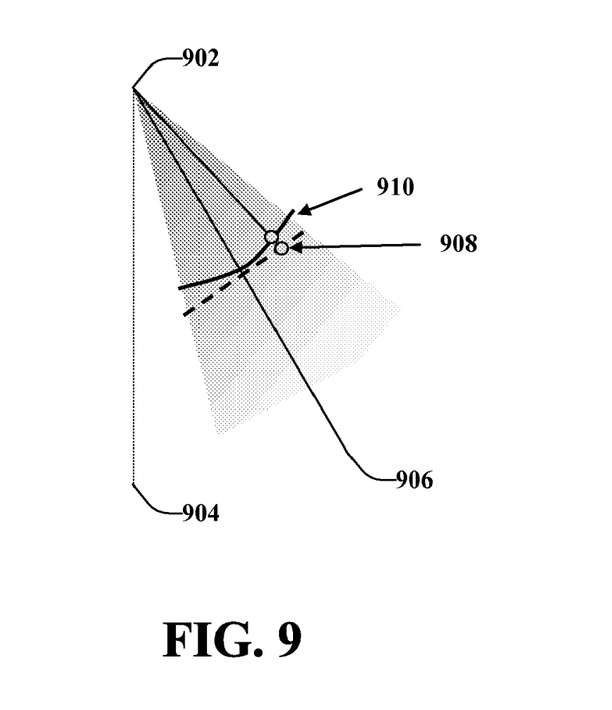
FIG. 9 illustrates generation of a virtual oblique image from a super-wide image.

FIG. 9 illustrates generation of a virtual oblique image from a super-wide image. A camera focal point 902 points down in the nadir direction 904. For each pixel on the new oblique image plane, a ray is defined, connecting the center of the pixel and the camera center. The oblique view direction is shown at 906 and the point on the oblique image plane is shown at 908. The corresponding projection on the ultra wide image plane is illustrated at 910. The sampling of the super-wide imagery at the intersection point of the ray with the image plane generated a color for the new oblique pixel.

As discussed, DSM is the three-dimensional model of the face of the earth including any object located on the earth (e.g., trees, houses, and the like). DSM can be utilized for various applications, such as the generation of orthophotos or for generating new virtual views of a particular scene. High quality DSM can be obtained from manual surveying, which is expensive. Alternatively, DSM can be generated by analyzing multiple views of the scene taken from different view points. The process that generates DSM includes matching corresponding features between those images. Each feature defines a view ray from the camera position and the intersections of those view rays define the position in space of the feature. Automatic matching is difficult and error prone, however.

The disclosed techniques can increase the coverage of every scene point. The use of a view angle having about 120 degrees (as opposed to 40 degrees) provides that the number of images that view the same ground point multiples more than six times. For example, if the common area between two neighboring 40 degrees nadir images is 66% then nine images can see a particular ground point, while more than fifty-six 120 degree images taken at the substantially the same interval can see substantially the same point. Thus, the reliability of the recovered DSM is enhanced.

In addition, super-wide images have greater visible coverage of the scene (e.g., vertical walls of buildings, areas underneath trees) that can not generally be seen in regular nadir imagery. Thus, the combination of the coverage from all views can generate enhanced DSM models.

Textures add to the visual content and realism of models. Aerial views are often utilized to texture models of terrain, buildings, and other objects on the earth. Basic texturing can be created by taking an object point and projecting it onto one or more images where it is visible to generate a color. However, since complex geometry has complex visibility, different cavities in objects can be seen only for a limited view direction. For example, walls of buildings may not be seen adequately, if at all, from a top view or the ground under a tree may be completely occluded from view.

In addition, different materials, such as reflective objects or semi-reflective objects have different reflective properties from different view directions. Thus, texturing these objects from a single point of view may generate unrealistic texture when such an object is viewed from a different direction. Another problem can be associated with stitching the texture from multiple images that are taken from different directions when the texture contains a directional component.

Utilizing the disclosed embodiments provides improved coverage that enables texturing areas that might not be covered by the limited capturing of oblique and nadir images. Surfaces that are occluded from these images (e.g., ground beneath trees) might be covered by new view directions at more extreme angles. The disclosed embodiments also provide each scene point viewed by more images and more view directions. This provides enhanced modeling of directional reflection properties. For example, the reflective component of a building window can be removed by analyzing several images of the window from different directions.

Figure 10:
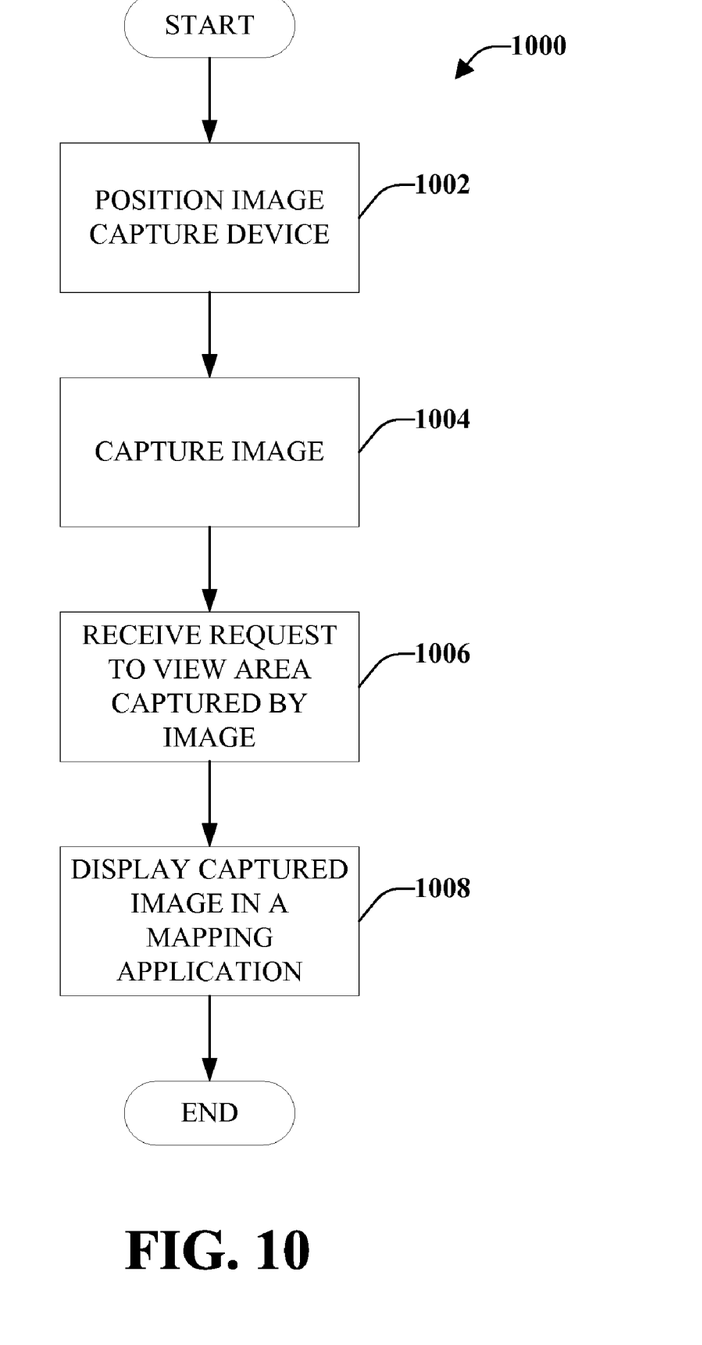
FIG. 10 illustrates a methodology for DSM modeling and texturing.
Figure 11:
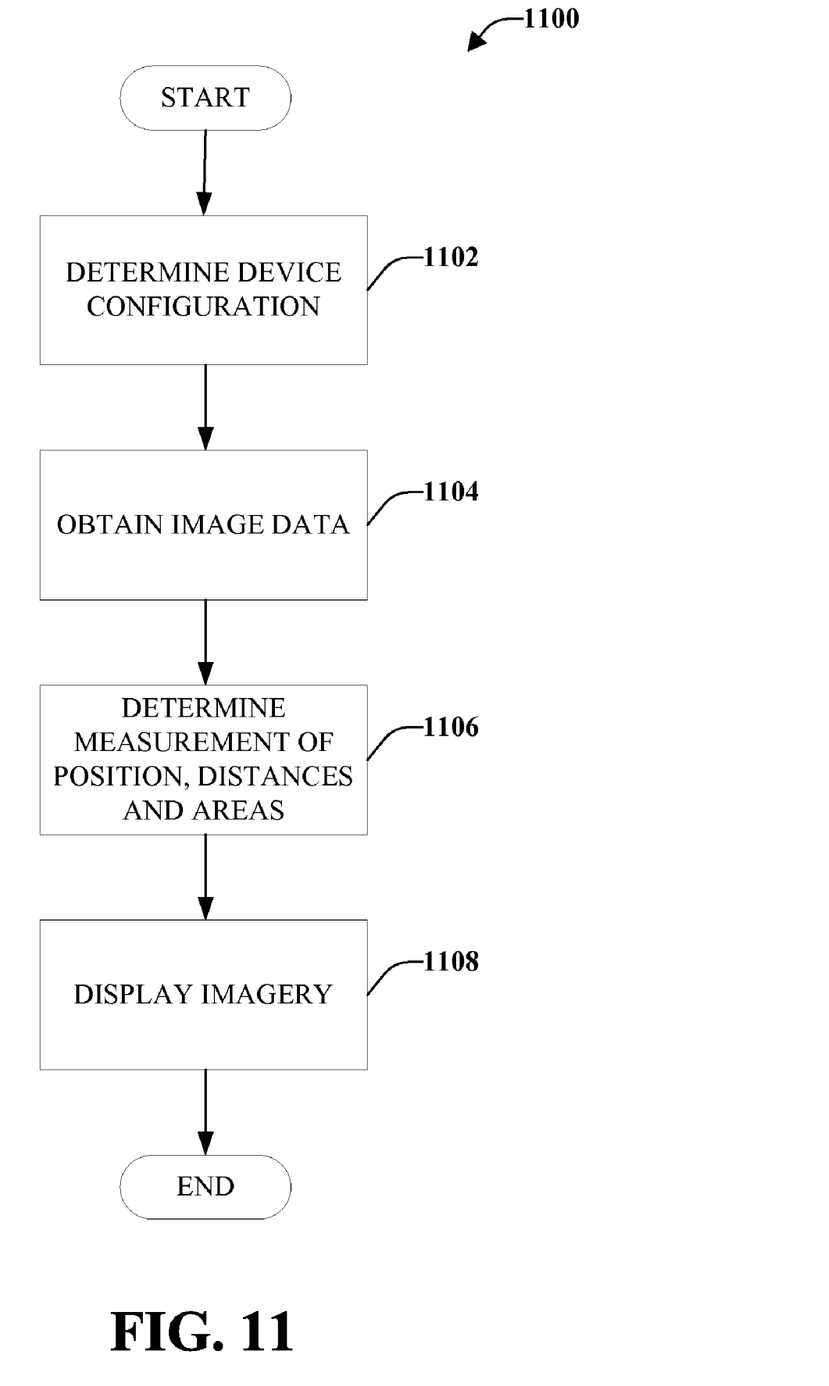
FIG. 11 illustrates another methodology for DSM modeling and texturing.

In view of the exemplary systems shown and described above, methodologies that may be implemented in accordance with the disclosed subject matter, will be better appreciated with reference to the flow charts of FIGS. 10 and 11. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 10 illustrates a methodology 1000 for DSM modeling and texturing. Method 1000 starts, at 1002, where one or more image capture devices are positioned to capture aerial images. The image capture devices include a wide-angle lens. Such positioning can include mounting the one or more image capture devices under an aircraft to obtain nadir imagery of the earth's terrain as well as various objects on the earth's surface. The image capture devices can be, for example, cameras having wide-angle lenses.

At 1004, one or more aerial images are captured by the one or more image capture devices. The aerial images include at least one object located on the surface of the earth. The images can be captured using nadir photography, oblique photography, or a combination. Images captured from two or more devices can be combined to render a single complete image that includes a higher granularity of detail than a single image.

A request to view the area captured by one or more image is received, at 1006. Such request can be received from a user that desires to view a particular area in a mapping application. The captured images can be displayed, at 1008. The displayed images can be dynamic whereby if a user pans around a display screen, the image changes in response to such user request. For example, the display screen can change between viewing aerial panorama images and images from a ground perspective, or another navigation angle.

FIG. 11 illustrates another methodology 1100 for DSM modeling and texturing. At 1102, the configuration of one or more image capture devices is determined. Such configuration can include a single lens, single sensor; single lens, multiple sensor; multiple lens, multiple sensor; and multiple lens, multiple sensor and a reflective surface. A lens can be, for example, a wide-angle lens or an ultra-wide angle lens.

At 1104, image data is obtained for a multitude of locations and objects on the surface of the earth. Such image data can be in the form of nadir images, oblique images, or other navigation angles. Image data can also include identifying an object in a viewing area and/or identifying a similar object or location in a multitude of images. The association of the object or location with the imagery can be applied to a mapping application that employs a large number of images to represent a model of the earth as well as various objects located on the earth's surface.

A measurement of position, distances and areas of an image is determined, at 1106. A distance that can be a linear distance between two points or a length along a polyline can be measured. Image points can be mapped to the corresponding ground points for distance calculation. In a similar manner, e areas on the ground or earth's surface can be measured by defining an area polygonal boundary in the image. Such an area can be determined using the ground position of the points corresponding to the polygon vertices in the image. The resulting imagery can be displayed upon a user request, at 1108.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on one or more nonvolatile computer-readable media that, when implemented by one or more processing devices, facilitates modeling and texturing for mapping applications, the system comprising:
   a first image capture component that is configured to capture wide-angle images, and that captures a first image from a first plurality of angles;
   a second image capture component that is configured to capture wide-angle images, and that captures a second image from a second plurality of angles;
   an object identification component that identifies an object that is included in both the first and second images;
   a modeling component that generates a model of the object based on different views of the object from the first and second images, wherein generating the model includes,
   a) identifying a point on the object in the first image that corresponds to a point on the object in the second image,
   b) determining a three-dimensional location in space of the point, and
   c) utilizing the three-dimensional location in space of the point to generate the model of the object; and
   a presentation component that displays the model of the object in a mapping application.

2. The system of claim 1, wherein at least one of the first image capture component and the second image capture component is a camera comprising a wide-angle lens.

3. The system of claim 1, wherein at least one of the first image capture component and the second image capture component is a single lens, single sensor camera.

4. The system of claim 1, wherein at least one of the first image capture component and the second image capture component is a single lens, multiple sensor camera.

5. The system of claim 1, further comprising a curved reflective surface that is configured to reflect light rays from a hemispherical area beneath an aircraft, wherein the first and second image capture components face inward toward the curved reflective surface.

6. The system of claim 1, wherein the first and second image capture components are in an outward facing configuration.

7. The system of claim 1, further comprising a synchronization module that synchronizes an image capture time between the first and second image capture devices to facilitate a common capture of a similar scene.

8. The system of claim 1, further comprising a combiner module that combines the first and second images captured by the first and second image capture devices, respectively.

9. The system of claim 1, further comprising a storage media that retains the first and second images in a retrievable format.

10. The system of claim 1, wherein at least one of the first image capture component and the second image capture component captures the respective first or second image in at least one of a nadir position and an oblique position.

11. A method for digital surface model (DSM) texturing and modeling, comprising:

positioning a first image capture device to obtain aerial images, the first image capture device comprising a wide-angle lens;

capturing a first aerial image utilizing the first image capture device, the first aerial image including an object located on the surface of the earth;

positioning a second image capture device to obtain aerial images, the second image capture device comprising a wide-angle lens;

capturing a second aerial image utilizing the second image capture device, the second aerial image including the object;

identifying a first point on the object in the first aerial image;

identifying a second point on the object in the second aerial image, wherein the second point corresponds to the first point on the object in the first aerial image;

translating the point on the object in the first aerial image into a first view ray in space;

translating the corresponding point on the object in the second aerial image into a second view ray in space;

determining an intersection of the first view ray and the second view ray, wherein the first view ray and the second view ray intersect each other, and wherein the intersection defines a position in space of the point on the object;

combining the first and the second aerial images based on at least the position in space of the point on the object, thereby providing a combined aerial image;

receiving a request to view an aerial image at a particular location, wherein the particular location corresponds to a location of the combined aerial image; and in response to the request, displaying the combined aerial image in a mapping application.

12. The method of claim 11, further comprising before positioning the first image capture device and the second image capture device, determining a configuration for the first image capture device and the second image capture device.

13. The method of claim 12, wherein the configuration is one of an inward facing configuration and an outward facing configuration.

14. The method of claim 12, further comprising:

placing the first image capture device and the second image capture device in a configuration that faces inward toward a reflective surface is configured to reflect light rays from a hemispherical area beneath an aircraft; and capturing the first and second aerial images from the reflective surface.

15. The method of claim 11, wherein capturing the first and second aerial images occurs at one or more of a nadir position and an oblique position with respect to the object.

16. The method of claim 11, further comprising determining at least one of a position measurement, a distance measurement and an area measurement of the first and second aerial images.

17. The method of claim 11, further comprising retaining the first and second aerial images in a retrievable format.

18. A system that provides texturing and modeling of Digital Surface Model (DSM) images, comprising:

means for capturing a first aerial image with a first wide-angle lens, wherein the first aerial image includes both nadir imagery and oblique imagery of the surface of the earth, and wherein the first aerial image includes an object;

means for capturing a second aerial image with a second wide-angle lens, wherein the second aerial image includes both nadir imagery and oblique imagery of the surface of the earth, and wherein the second aerial image includes the object;

means for identifying the object;

means for identifying a first point on the object in the first aerial image;

means for identifying a corresponding point on the object in the second aerial image, wherein the corresponding point corresponds to the point on the object in the first aerial image;

means for combining the first and the second aerial images based on matching the point on the object in the first aerial image with the corresponding point on the object in the second aerial image; and means for presenting the combined aerial image in a map application.

19. The system of claim 18, further comprising:

means for capturing a third and a fourth aerial image with a wide-angle lens; and means for synchronizing the capturing of the first and second aerial images and second aerial images and the capturing of the third and the forth aerial images.

20. The system of claim 19, further comprising means for combining the third and fourth aerial images with the first and second aerial images.

* * * * *